June 9, 1942.  E. KRIMSKY  2,285,987
OPTICAL INSTRUMENT
Filed March 25, 1940  2 Sheets-Sheet 1

Inventor
Emanuel Krimsky
Raymond Jones
By
Attorney

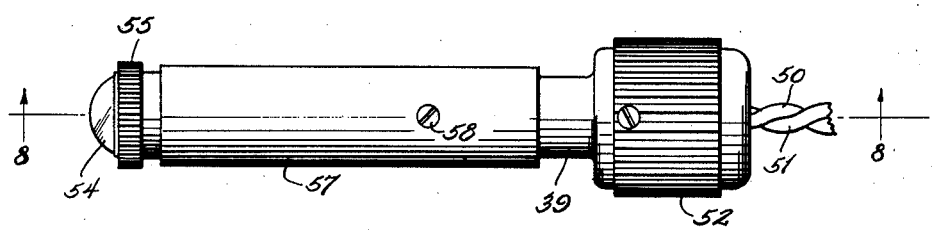
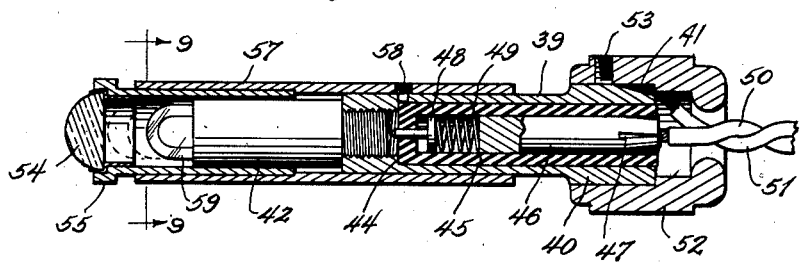
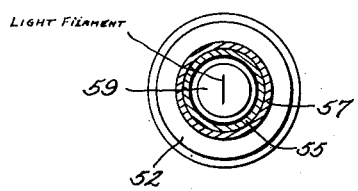
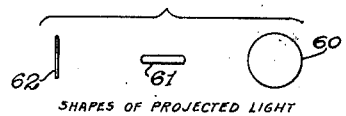
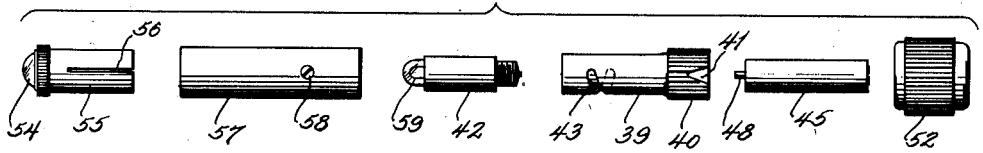

Patented June 9, 1942

2,285,987

UNITED STATES PATENT OFFICE 2,285,987

OPTICAL INSTRUMENT

Emanuel Krimsky, Brooklyn, N. Y.

Application March 25, 1940, Serial No. 325,875

7 Claims. (Cl. 88—20)

My invention relates to a light weight slit-lamp and an associated optical instrument and has particular reference to a slit-lamp and microscope unit adapted for use in examinations of the surface and sub-surface of the eyeball.

A typical slit-lamp and microscope unit is disclosed in Patent No. 1,631,329, patented June 7, 1927, by W. L. Patterson. Instruments of this type having self-contained batteries are expensive, bulky and cumbersome. Furthermore, such instruments require the use of both hands of an operator for their operation. The physician is therefore not afforded the free use of his hands to manipulate the object under examination. Moreover, where the slit-lamp microscope of the above referred to type may be detached and replaced by other instruments, it will be found that such an interchange delays the examination and is disconcerting to the patient.

The main object of my invention is to provide an extremely light weight, compact slit-lamp and microscope device that is economical to manufacture and simple to operate.

Another object of my invention is to provide an instrument of the class described which may be manipulated by one hand of the operator so as to permit manipulation of another instrument with the other hand of the operator.

Another object of my invention is to provide a slit-lamp and microscope adapted to be attached to an eye-glass frame to afford complete freedom of the operator's hands for manipulations incidental to the various examinations, or necessary operations.

A further object of my invention is to provide a novel means to vary the form of a light beam in a slit-lamp.

For a full disclosure of the invention, reference is made to the accompanying drawings, wherein—

Fig. 7 is a view in side elevation of the novel slit-lamp associated with the device;

Fig. 8 is a view in section on line 8—8 of Fig. 7;

Fig. 9 is an end view of the slit-lamp;

Fig. 10 is a schematic diagram showing various shapes of light beams projected by the slit-lamp; and Fig. 11 is an exploded view showing the structural elements of the slit-lamp.

Figure 1:
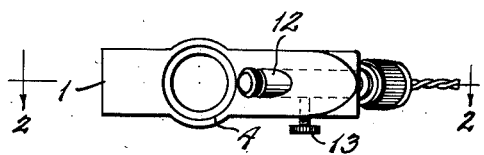
Figure 1 is a plan view of a hand-supported type of slit-lamp and miscroscope embodying my invention.

Referring to the drawings in detail, the slit-lamp miscroscope in one embodiment comprises an elongated bar 1 which is provided with a finger hold 2 in the form of a circular opening 3 extending transversely through one end of the bar. The bar 1 is cylindrically enlarged near its center and is provided at that point with a circular opening 4 extending therethrough at a right angle to the opening 3. The opening 4 is constricted at one end to form a shoulder 5 and is provided with internal threads 6 at the opposite end. The lens system is a high power short focus type such as a ten power (10X) double aplanatic lens system or a pair of plano-convex lenses 7 and 8 as are mounted in the opening 4. The lens 7 rests on shoulder 5 and is separated from the lens 8 by a circular collar 9. The lenses are secured in position by an externally threaded ring 10. The bar 1 is provided with circular channel 11 adjacent the hole 4. The channel extends through the bar at an angle of forty-five degrees with respect to the optical axis of the lens system. The channel 11 is adapted to receive a slit-lamp 12. The lamp unit is secured in position by a set screw 13.

Figure 4:
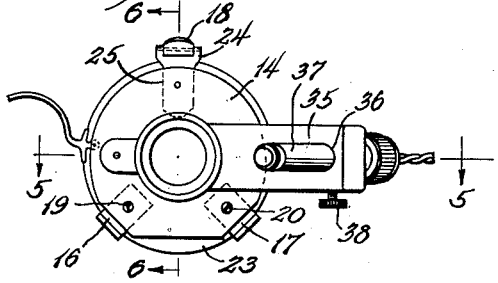
Fig. 4 shows a modification of the slit-lamp and microscope associated with an eyeglass frame.

In another embodiment of my invention, the slit-lamp and microscope is adapted to be removably mounted on the lens or frame of an operator's eyeglasses as is shown generally in Fig. 4 of the drawings. In this form, the microscope comprises a circular plate 14 which is provided with centrally located circular opening 15. The plate 14 may be detachably secured to the eyeglasses by means of supports 16, 17 and 18 which are attached to the side of the plate facing the lens of the eyeglass. Supports 16 and 17 are L-shaped members which are secured by screws 19 and 20 to the lower portion of plate 14, as shown in Fig. 4. The supports 16 and 17 are bent at their outer ends to form channels 21 and 22 which receive the edge of the eyeglass 23. As an equivalent or more simple construction, the supports 16 and 17 may be formed integrally with the plate 14. The support 18 is pivotally mounted in a yoke 24 formed in the end of a vertical member 25 which is secured to the face of plate 14. The lower end of member 25 has a bent out portion 26 which is perforated to receive one end of a spring 27, the other end of which is attached to the support 18. The tension of spring 27 draws the support 18 downwardly about its pivot causing it to engage the edge of the eyeglass frame 23. The support 18 is extended at one end beyond its pivotal point to serve as a lever by which the operator may raise the frame engaging end of the support and attach the plate 14 to the eyeglass. The frame engaging end of support 18 is bent to form a channel 28 which engages the upper edge of the eyeglass frame. The microscope comprises a cylindrical tube 29 which is constricted at its outer end to form a shoulder 30 and is interiorly threaded at the opposite end. A lens 31 is positioned in the tube 29. Lens 31 rests on the shoulder 30 and is secured in the tube by an externally threaded ring 34. The cylindrical tube 29 is formed integrally with an arcuate bar 35 which is curved horizontally and outwardly away from the plane of plate 14 and the operator's eyeglasses. The outer end of bar 35 is provided with a channel 36 which is adapted to receive a slit-lamp 37. The slit-lamp is secured in place by a set screw 38. The curvature of bar 35 is such that the slit-lamp 37 is supported in the channel 36 at an angle of about thirty degrees with respect to the optical axis of the microscope to direct the light on the focal point of the lens system. The plate 14 may be secured to bar 35 by screws 35'.

The novel slit-lamp employed with the above-described microscopes comprises a slit-lamp holder and a lens tube to concentrate and focus the light from the lamp. The slit-lamp holder comprises a metal tube 39 which has an enlarged knurled head 40. The head 40 is flattened at one point 41 for a purpose to be described. The opposite end of the tube 39 is internally threaded to receive a slit-lamp 42. The wall of tube 39 is provided with a helical slot 43. The metal tube 39 is constricted adjacent the threaded portion thereof to form a shoulder 44. A cylindrical tube 45 of insulating material having a closed end rests against the shoulder 44. The insulating tube 45 contains a metal cylinder 46 which is provided at one end with a slot 47. The closed end of the insulating tube 45 is perforated at its center to receive a contact pin 48. The contact pin 48 is forced outwardly by a spring 49 which rests against the metal cylinder 46. The conductor comprising leads 50 and 51 supplies current to the lamp from a pocket battery or other source. The slot 47 in cylinder 46 receives lead 50 which is secured therein by crimping the slotted end of the cylinder. Lead 51 engages the flat portion 41. A knurled tube 52 forms a cap for the end 40 of the tube 39, thereby crimping lead 51 against the portion 41. The cap 52 may be secured in position with a set screw 53. A lens 54 is supported in the enlarged end of a tube 55. The lens tube 55 is provided with longitudinal slots 56. A cylindrical tube 57 receives the lens tube 55 and is adapted to slip over the slit-lamp 42 and the tube 39 of the lamp holder. The wall of the tube 57 is provided with a threaded pin 58 which engages the helical slot 43 in the wall of the tube 39. The slit-lamp 42 contains a flat loop type of filament 59 which produces a linear source of light.

To operate the slit-lamp, the condenser lens 54 is brought into the desired focus by sliding the lens tube 55 in the cylinder 57. The cap 52 and tube 39 of the slit-lamp holder may then be rotated and caused to move backward or forward in the cylinder 57 through the cooperation of the pin 58 and the helical slot 43. When the slit-lamp is out of the focal plane of and closer to the condenser lens 54, a circle of light 60 is projected. However, when the longitudinal movement of the slit-lamp holder brings the lamp filament 59 within the focal plane of the lens 54, a vertical slit 61 or a horizontal slit 62 of light is projected depending upon whether the line filament is vertical or horizontal when in focus.

To attach the slit-lamp to the microscopes described herein, the condenser lens tube 55 is removed from the cylinder 57. The slit-lamp holder may then be inserted in either the channel 11 of the microscope shown in Fig. 1 or the channel 36 of the microscope shown in Fig. 4. The slit-lamp may be secured in either channel by means of the set screws provided. The set screws in each instance grip the metal cylinder 57 of the slit-lamp holder and do not interfere with the backward and forward movement of the slit-lamp 42. The condenser lens tube 55 may then be inserted in the cylinder 57 and moved longitudinally therein until the lens 54 is brought to focus on the focal point of the lens systems of the microscopes. As above described, the slit-lamp holder may be moved backward or forward by rotating the cap 52 to selectively obtain a vertical slit, a horizontal slit or a homogeneous circle of light as may be desired.

Figure 2:
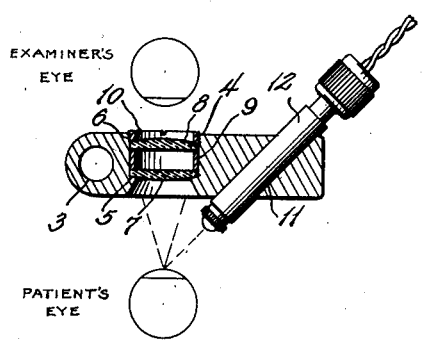
Fig. 2 is a view in section on line 2—2 of Fig. 1.
Figure 3:
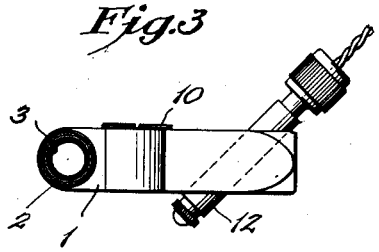
Fig. 3 is a side view of the device.

The microscope shown in Figs. 1 to 3 having the slit-lamp incorporated therein are extremely light, weighing approximately an ounce. The physician in using the microscope may adjust the slit-lamp to satisfy his particular requirement and hold the instrument by the finger supports 2 with the thumb and forefinger of one hand thus leaving one hand free to manipulate the object examined.

Figure 5:
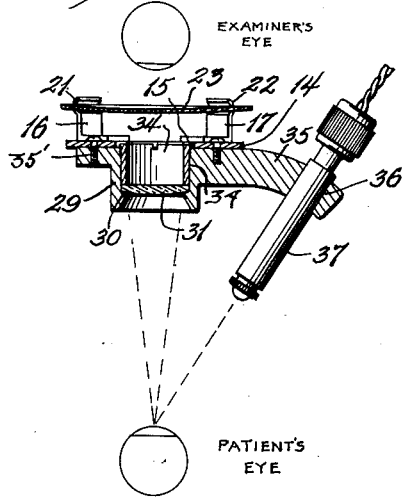
Fig. 5 is a view in section on line 5—5 of Fig. 4.
Figure 6:
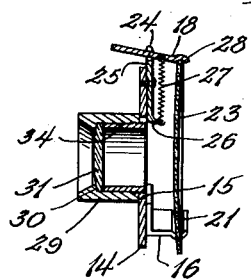
Fig. 6 is a view in section on line 6—6 of Fig. 4.

In the embodiment of my invention shown in Figs. 4 to 6, in which the microscope is attached to the eyeglass frame, the physician is free to use both hands during the examination. This type of instrument usually contains a lower power lens system to provide a longer focal length, thereby giving increased room to manipulate the object examined.

While I have disclosed a preferred form of the invention, it is to be understood that other modifications and various equivalents are contemplated such as may be embraced within the scope of the appended claims.

I claim:

1. In combination, a frame member having an opening extending transversely therethrough, a microscope lens positioned in said opening, said member being provided with a second opening extending transversely therethrough, the axes of said openings being directed to form an angle therebetween, said second opening being adapted to detachably support a lamp unit therein whereby the light from the lamp may be projected on an object positioned to one side of the frame member and means mounted on the other side of the frame member for securing the member to an eye glass, said means comprising a clamp element rigidly fixed to the member and another clamp element pivotally secured to the member, said clamp elements being operative to engage opposite sides of the eyeglass.

2. In a device as set forth in claim 1, wherein the frame member comprises an end portion bent out of the plane of the member, the second opening through which the light support extends being formed in the bent end portion.

3. A device as set forth in claim 1, wherein the lamp unit comprises a tubular element, a condensing lens mounted therein, an electric lamp supporting element slidably mounted in said tubular element to permit movement toward and away from said condensing lens, means for moving said lamp supporting element comprising a pin on one of said elements, a helical slot formed in the wall of the other element, said pin being engaged in said slot whereby rotation of one element with respect to the other element will cause the lamp supporting element to slide along said tubular element.

4. A device as set forth in claim 1 wherein the light support comprises a tubular member, a condensing lens mounted on said member, a lamp supporting member slidably mounted on the tubular member, an electric filament lamp carried by the supporting member, said lamp and supporting member being adjustable to vary the position of the filament with respect to the focal point of the lens, interengaging means associated partly with said tubular member and partly with said supporting member and being operable upon rotation of one of said members to vary the position of the filament and lamp with respect to the focal point of the lens for varying the cross-sectional shape of the light beam from the lamp.

5. A device as set forth in claim 1 wherein the light support comprises a tubular member, a condensing lens mounted on said tubular member, an electric filament lamp and a supporting member therefor slidably mounted on said tubular member to permit movement toward and away from said lens to vary the position of the lamp filament with respect to the focal point of said lens, means for moving said lamp and supporting member comprising a pin on one of said members, a helical slot formed in the wall of the other member, said pin engaging said slot whereby rotation of one member with respect to the other member will cause the lamp and supporting member to slide along said tubular member whereby to cause the rays of light from said filament to be varied selectively to form a flat beam of light positioned in one plane, a flat beam of light in a plane normal to said first-named plane, or a homogeneous circle of light.

6. In a device as set forth in claim 1, wherein each clamp element is provided on the free end with a recessed portion for engaging the edge of the eyeglass, and a spring member operably secured to the pivoted clamp element for forcing the latter against the eyeglass.

7. In a device as set forth in claim 1, wherein the frame member is shaped to provide a circular enlarged portion concentric with the first-named opening, the clamp elements being secured adjacent the outer edge of said enlarged portion.

EMANUEL KRIMSKY.